US011912515B2

(12) United States Patent
Rajabi

(10) Patent No.: US 11,912,515 B2
(45) Date of Patent: Feb. 27, 2024

(54) SYSTEM AND METHOD FOR PARTS HANDLING USING A LINEAR MOTOR CONVEYOR

(71) Applicant: ATS Automation Tooling Systems Inc., Cambridge (CA)

(72) Inventor: Amir Rajabi, Cambridge (CA)

(73) Assignee: ATS Corporation, Cambridge (CA)

( * ) Notice: Subject to any disclaimer, the term of this patent is extended or adjusted under 35 U.S.C. 154(b) by 0 days.

(21) Appl. No.: 17/734,197

(22) Filed: May 2, 2022

(65) Prior Publication Data
US 2022/0250859 A1 Aug. 11, 2022

Related U.S. Application Data

(63) Continuation of application No. PCT/CA2020/051484, filed on Nov. 2, 2020.

(60) Provisional application No. 62/929,369, filed on Nov. 1, 2019.

(51) Int. Cl.
| | |
|---|---|
| *B65G 54/02* | (2006.01) |
| *H02K 41/02* | (2006.01) |
| *B65G 47/68* | (2006.01) |
| *B65G 47/90* | (2006.01) |

(52) U.S. Cl.
CPC ............ *B65G 54/02* (2013.01); *B65G 47/68* (2013.01); *H02K 41/02* (2013.01); *B65G 47/90* (2013.01); *B65G 2203/0233* (2013.01)

(58) Field of Classification Search
CPC ........ H02K 41/02; B65G 54/02; B65G 47/68; B65G 47/52; B65G 47/90

USPC ........ 198/429, 433, 460.1, 468.3; 414/795.9, 414/796.9, 796.4
See application file for complete search history.

(56) References Cited

U.S. PATENT DOCUMENTS

| | | | | |
|---|---|---|---|---|
| 5,630,311 | A * | 5/1997 | Flix ................... | B65B 21/06 198/459.8 |
| 5,942,188 | A * | 8/1999 | Lepper ............... | G05B 19/4189 422/65 |
| 8,594,833 | B2 * | 11/2013 | Goodman ............ | B65G 47/918 700/214 |
| 2015/0203304 | A1 * | 7/2015 | Morency ................ | B65G 61/00 414/797 |

(Continued)

FOREIGN PATENT DOCUMENTS

| | | | | |
|---|---|---|---|---|
| DE | 102015209618 A1 * | 12/2016 | ............. | B65G 54/02 |
| WO | 2022090259 | * 5/2022 | ............. | B65G 54/02 |

*Primary Examiner* — James R Bidwell
(74) *Attorney, Agent, or Firm* — Amarok IP Inc.; Neil W. Henderson

(57) ABSTRACT

A system and method for parts handling including: a plurality of parts arranged in a first configuration; a linear motor conveyor including a linear motor track and a plurality of moving elements; a pick and place device configured to move at least a subset of the parts from the first configuration to the linear motor conveyor system; and a control system configured to: determine locations of the parts within the first configuration; control the linear motor conveyor to move the moving elements to positions related to the locations of the parts within the first configuration; control the pick and place device to move the parts generally simultaneously to the corresponding moving elements; and after receiving the parts, move the moving elements such that the parts are in a second configuration that is different from the first configuration.

18 Claims, 9 Drawing Sheets

(56) References Cited

U.S. PATENT DOCUMENTS

2016/0159583 A1* 6/2016 Keil .................. B65G 47/715
198/440
2018/0162659 A1* 6/2018 Wipf .................. B65G 54/02

* cited by examiner

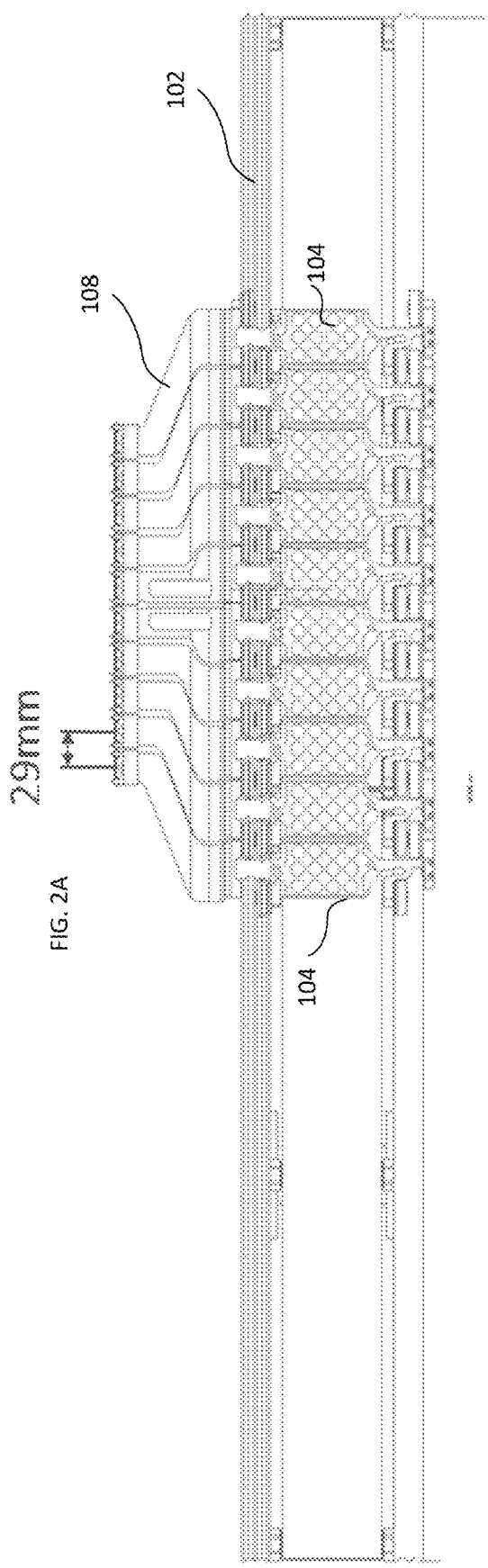
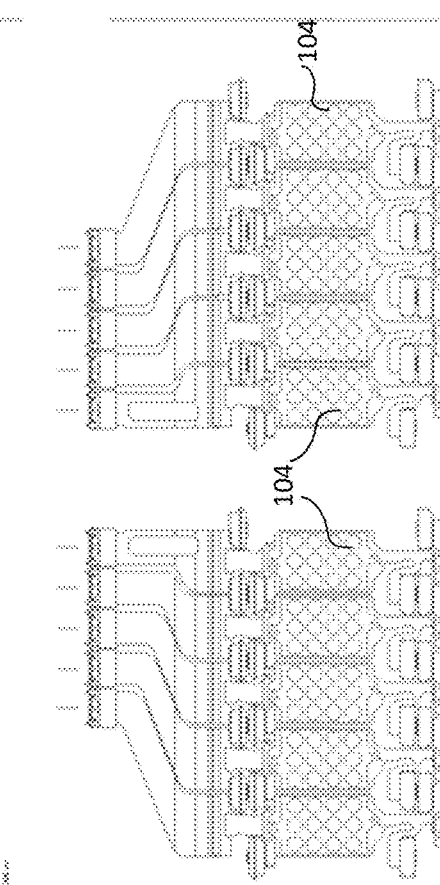
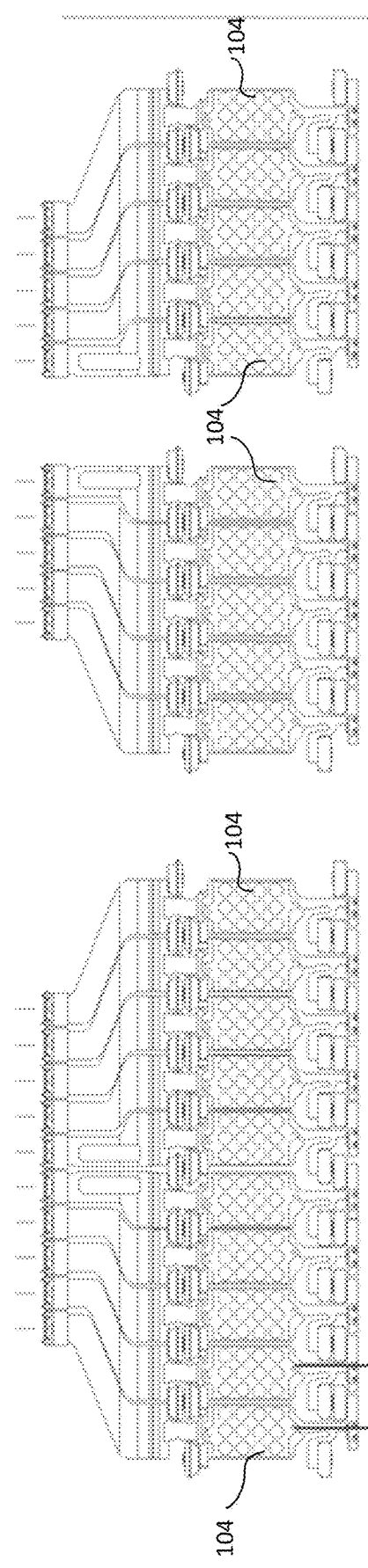

SYSTEM AND METHOD FOR PARTS HANDLING USING A LINEAR MOTOR CONVEYOR

RELATED APPLICATION

The present disclosure is a continuation of PCT Application No. PCT/CA2020051484 filed Nov. 2, 2020 which claims priority on U.S. Provisional Patent Application No. 62/929,369 filed on Nov. 1, 2019, which are hereby incorporated in their entirety herein.

FIELD

The present disclosure relates generally to linear motor conveyor systems and, more particularly to a system and method for parts handling using a linear motor conveyor that allows for handling of voids and/or faulty parts within a moving element.

BACKGROUND

In any manufacturing environment, it is generally important to be able to handle parts quickly and efficiently in order to provide for the largest throughput. One of the problems that can arise relates to situations where a group of parts arrive at a station in one configuration and need to be in a different configuration for further processing. This problem can be compounded when the first configuration includes voids, parts that are defective/faulty, need additional processing compared with other parts in the group, or need to be handled differently for any of various reasons (collectively referred to as "blanks").

Linear motor conveyor systems have proved effective at moving parts quickly and efficiently among workstations on an assembly line in a fast, efficient manner. However, conventional linear motor systems frequently rely on cabling, wherein each moving element is attached to the system by cabling to provide power or the like. In this case, cable management is important to avoid intertwining of cabling between moving elements, and it can be difficult to obtain a change in configuration having the flexibility needed for some reconfigurations of parts. This can lead to reduced efficiency of the overall system.

Therefore there is a need for an improved system and method for parts handling that allows for handling of blanks efficiently.

SUMMARY

According to an aspect herein, there is provided a system for parts handling including: a plurality of parts arranged in a first configuration; a linear motor conveyor including a linear motor track and a plurality of moving elements wherein the plurality of moving elements can be independently positioned along the linear motor track; a pick and place device configured to move at least a predetermined subset of the plurality of parts from the first configuration to the linear motor conveyor system; and a control system in communication with the linear motor conveyor and pick and place device and configured to: determine locations of the predetermined subset of the plurality of parts within the first configuration; control the linear motor conveyor to move the moving elements to positions related to the locations of the predetermined subset of parts within the first configuration; control the pick and place device to move the predetermined subset of parts simultaneously to the corresponding moving elements; and after receiving the parts, move the moving elements such that the predetermined subset of parts has a second configuration that is different from the first configuration.

In some cases, the first configuration may include blanks. In some cases, the first configuration may include a matrix of rows and columns. In some cases, the second configuration may include a linear row.

In some cases, the system may further include a detection device in communication with the control system and configured to determine the locations of the selected subset of parts.

In some cases, the first configuration may include good parts and faulty parts and the selected subset of parts may include a plurality of the good parts. In this case, the second configuration may include only good parts.

In some cases, the positions related to the locations of the predetermined subset of parts within the first configuration may include positions adjacent to the locations of the predetermined subset of parts within the first configuration.

In some cases, the linear motor conveyor may include more than one linear motor conveyor and the control system controls each of the more than one linear motor conveyors to independently move respective moving elements to positions related to the locations of the predetermined subset of parts within the first configuration.

According to an aspect herein, there is provided a method for parts handling including: moving a plurality of parts having a first configuration to a transfer station; selecting at least a subset of the plurality of parts based on a predetermined criterion; moving moving elements on a second conveyor to positions related to positions of the selected subset of the plurality of parts in the first configuration; moving the selected subset of the plurality of parts to the related moving elements on the second conveyor; and once the moving elements are full, moving the moving elements into a second configuration that is different from the first configuration In some cases, the first configuration may include blanks as well as parts. In some cases, the first configuration may include a matrix of rows and columns and the second configuration may include a linear row.

In some cases, the predetermined criterion may include a determination of whether a part is good or faulty.

In some cases, the predetermined criterion may include a determination of whether a part is available for further processing or not.

In some cases, the method may further include determining if all moving elements on the second conveyor are filled or not and, if not, repeating the selecting at least a subset through to the moving the selected subset until the moving elements are filled.

In some cases the method may further include transferring the parts from the second configuration for further processing. In these cases, the transferring the parts from the second configuration for further processing may include picking and placing the parts in the second configuration onto a third conveyor. Further, the method may include determining if all parts meeting the predetermined criterion have been moved to the second configuration and transferred for further processing and, if not, repeating the method from selecting at least a subset of parts.

In some cases, the method may further include detecting, via a detection device, positions of the selected subset of parts.

In some cases, the positions related to positions of the selected subset of the plurality of parts in the first configuration may include positions adjacent to the positions of the predetermined subset of parts within the first configuration.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 2A illustrates a plurality of moving elements on a track section;

FIGS. 2B and 2C illustrate additional views of the plurality of moving elements;

DETAILED DESCRIPTION

Generally, the present disclosure provides a system and method for parts handling using a linear motor conveyor. Generally speaking, the system and method presented herein are intended to provide for moving parts arranged in a first configuration from a first location to a receiving location where the parts are arranged in a different configuration. More specifically, the system and method are configured to pick a predetermined set of parts from a first conveyor system where the parts are in the first predetermined configuration/pitch and then place the parts in a second configuration/pitch that is different from the first configuration at a receiving location. In some cases, it is intended that the system may selectively move only parts that have passed quality assurances. In some cases, the system may determine whether there are voids or faulty parts ("blanks") within the set of parts. The system may then condense the configuration of parts to remove/reduce any blanks to provide for more efficient parts handling at a second conveyor system. In a particular case, the conveyor system may include at least one pick and place mechanism configured to move parts from one conveyor system to another.

Figure 1A:
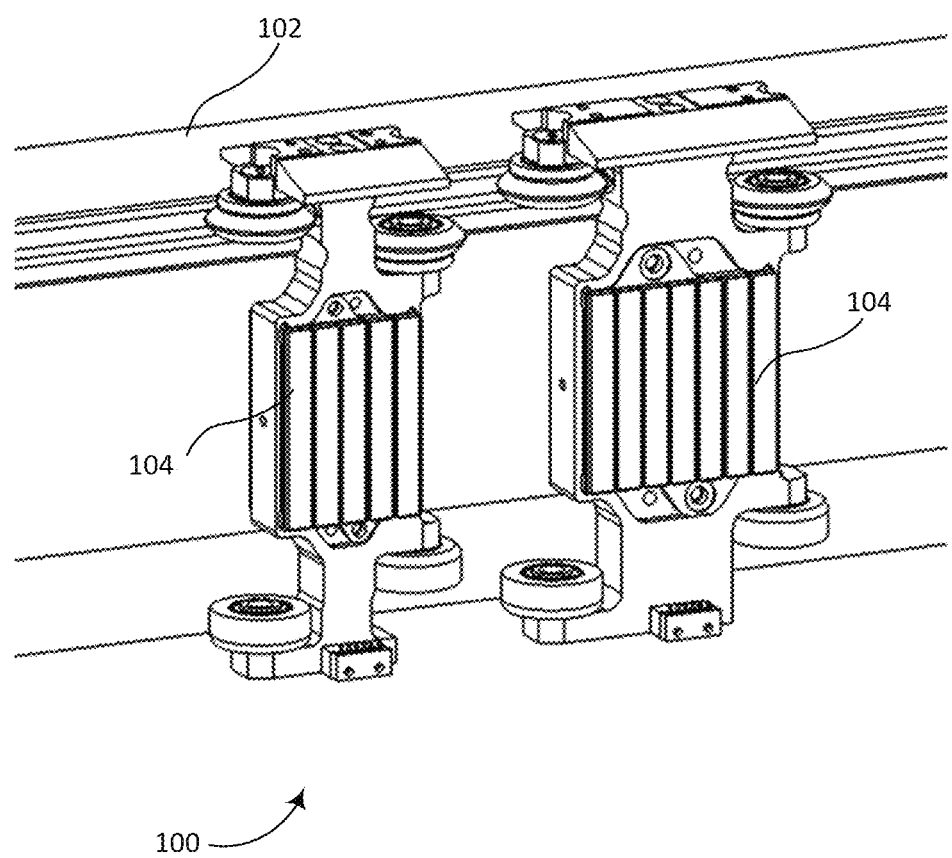
FIG. 1A illustrates a linear motor conveyor with a plurality of moving elements.
Figure 1B:
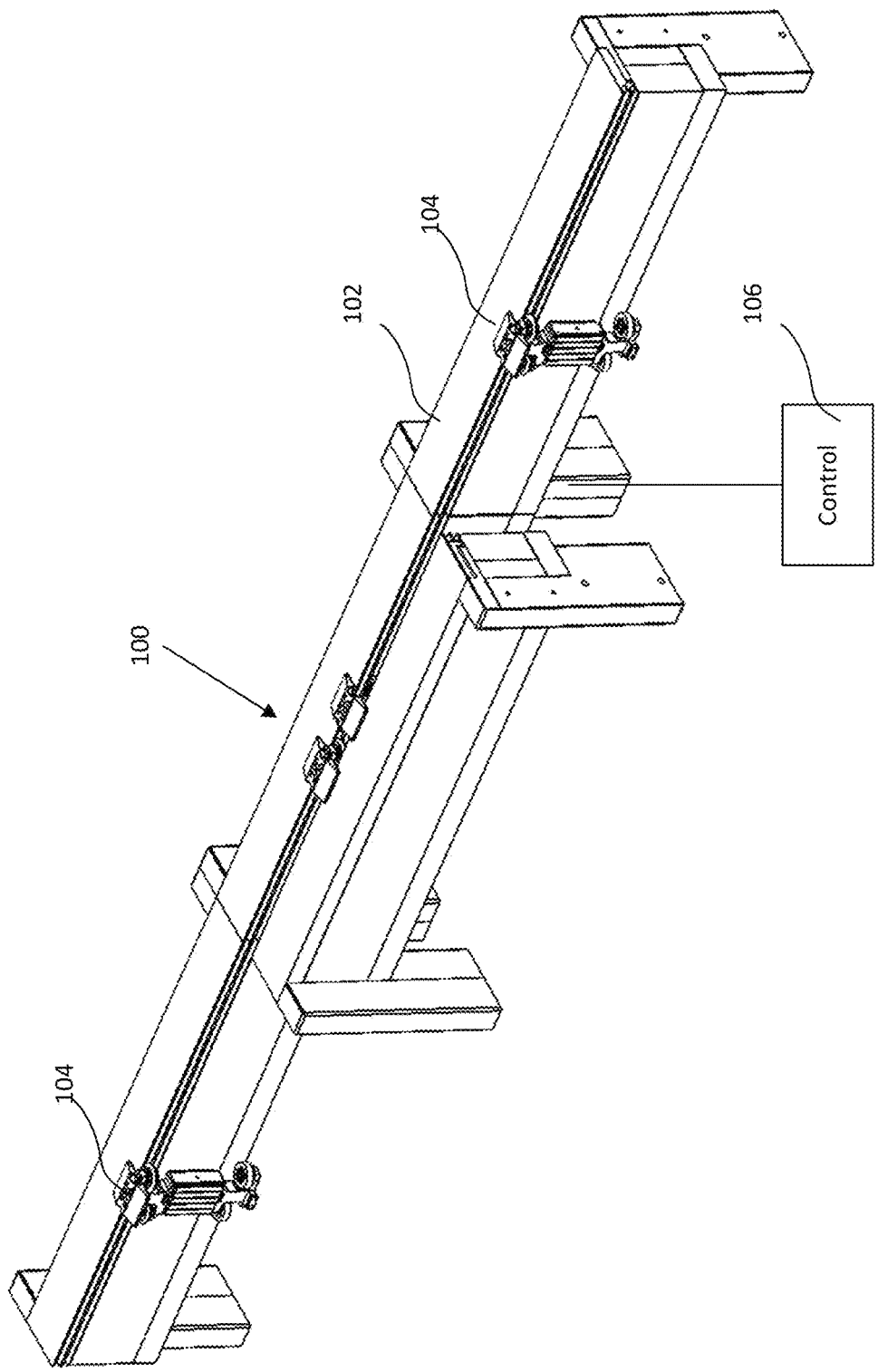
FIG. 1B illustrates a linear motor conveyor formed of track sections.

FIG. 1A is a perspective view illustrating a linear motor conveyor system 100. The conveyor system 100 includes at least one track section 102 and one or more moving elements 104. As shown in FIG. 1B, in some embodiments, the conveyor system 100 may be composed of a plurality of track sections 102 which are mechanically self-contained and separable from one another so as to be modular in nature. In this case, the track sections 102 may be mounted on a support (not shown) so as to align and abut one another in order to form the conveyor system 100. In order to be modular, each track section 102 may house self-contained electronic circuitry for powering and controlling the track section. Each track section 102 or the conveyor system 100 may include or be connected to a control system 106, which is configured to independently drive and monitor the location of the moving elements 104 on the track section 102 and/or within the conveyor system 100. The moving elements can be independently driven/moved in the context of independent control of the position of each moving element on the track within the confines of not being able to pass each other on the track. Some of the principles of operation of a similar conveyor system 100 are described in more detail in U.S. Pat. No. 8,397,896 to Kleinikkink et al., which is hereby incorporated herein by reference.

In this type of linear motor conveyor, the moving element is controlled to move along a track by electromotive force. In particular, in this type of linear motor conveyor, the moving elements can be independently controlled and their positions adjusted along the track section or track generally independent of each other. The structure is also such that cabling systems connected with the moving elements are generally not required as the movement is controlled by controlling the electromotive force between individual motor coils of the linear motor conveyor and the moving elements.

FIGS. 2A to 2C are side views of embodiments of moving elements 104 (ten of which are illustrated). FIG. 2A shows the moving elements on the track section 102. FIGS. 2B and 2C show the moving elements 104 in two different configurations. The moving elements 104 are configured to travel along the track section 102. In this case, each of the moving elements 104, are provided with a pitch reduction platform 108, which allows the pitch between moving elements 104 to be reduced, for example from a pitch of 50 mm between moving elements to a pitch of 29 mm between pitch reduction platforms. It will be understood that other pitch configurations can be provided. Each of the pitch reduction platforms 108 is configured to appropriately interact with each of the other pitch reduction platforms. Other configurations may be used to allow for a reduced pitch with modifications to the platform or the like.

In some embodiments, the moving elements 104 can be oriented in pairs, such that the wheels of adjacent moving elements overlap as shown in FIGS. 2A to 2C. Providing the ability to the moving elements to overlap is intended to allow for smaller pitches between moving elements 104.

Figure 3:
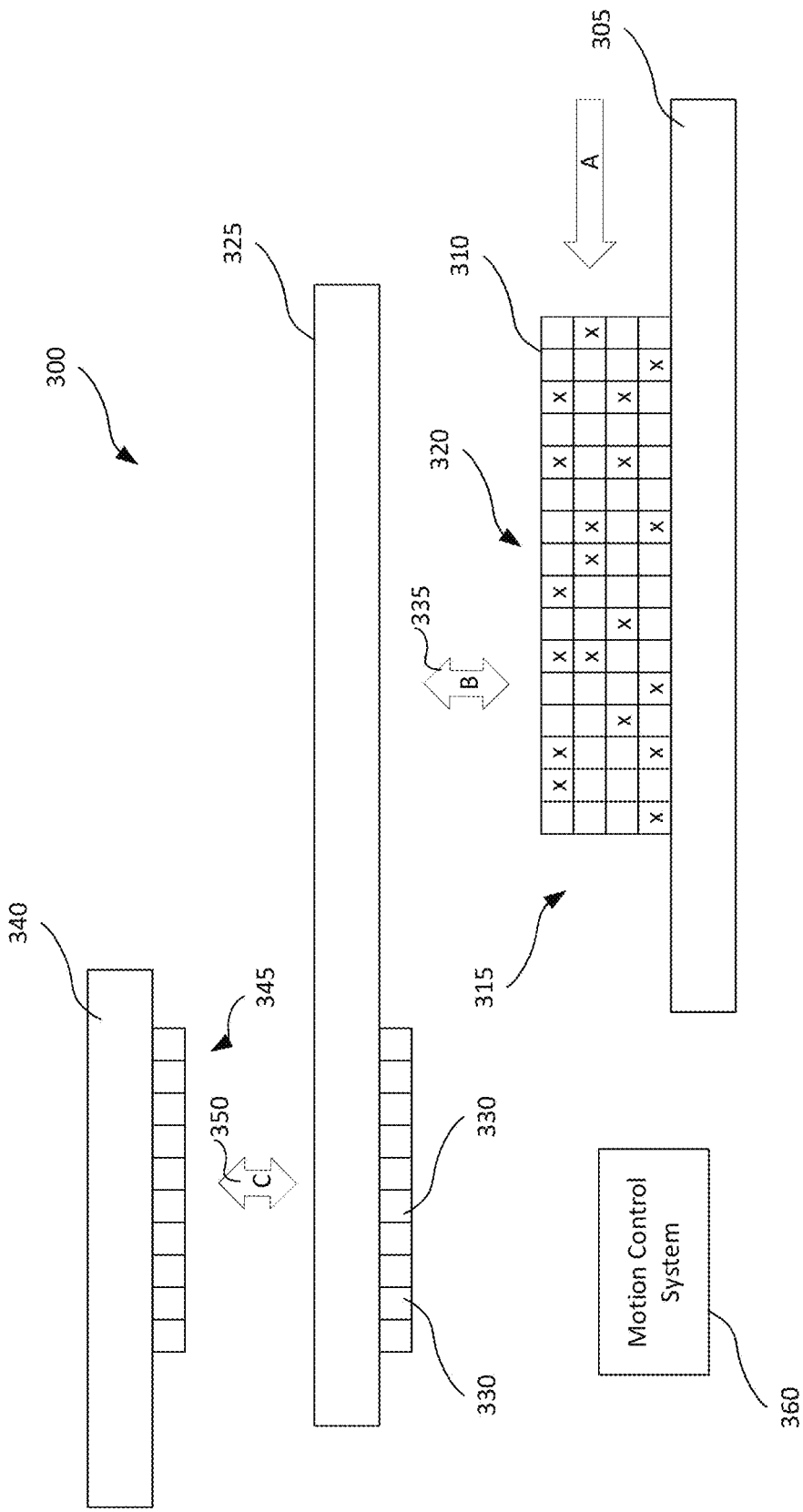
FIG. 3 illustrates a system for parts handling according to an embodiment.

FIG. 3 illustrates a portion of an assembly line or portion of a manufacturing environment which includes an embodiment of the system for parts handling 300. A first conveyor 305, which can be any of various types of conveyors, has one or more moving elements (not visible), which deliver (arrow "A") at least one pallet of parts 310 to a predetermined location (for example, a processing station 315). The first conveyor 305 may be, for example, a belt conveyor, a hand cart, a linear motor conveyor, or any of various other devices to convey the pallet of parts 310 to the processing station 315. The pallet of parts 310 has a first predetermined configuration, for example, a matrix of rows/columns of parts 320. The first configuration may include both selected parts and non-selected parts based on a predetermined criterion. For example, the selected parts may be good parts and the non-selected parts may be faulty parts or voids (i.e. where a faulty part has been removed or the like) (collectively "blanks"). The blanks may be randomly distributed within the first configuration of parts. As an example, blanks are indicated by an "x" in FIG. 3. It will be understood that the pallet of parts 310 may also have other configurations such as linear, square, circular, triangular, or the like.

The system 300 also includes a transfer conveyor 325, in this case, a linear motor conveyor, including a plurality of moving elements 330 that are used to reconfigure or re-pitch the parts from the first configuration to a second configuration as described below. The system 300 also includes a pick and place device 335, illustrated by arrow "B", for moving parts from the first conveyor 305 to the transfer conveyor 325. The system 300 may also include a third conveyor 340 having one or more moving elements (not visible) that carry a pallet of parts 345 having a second configuration that is different from the first configuration. The system 300 would then also include a second pick and place device 350, illustrated by arrow "C", for moving parts from the transfer conveyor 325 to the third conveyor 340.

The system 300 may include a motion control system 360 which may be operatively connected with the control system 106 of the track section 102 or conveyor system 100. The motion control system 360 includes a processor and memory component which are intended to be in communication with each other but may be distributed over various locations or may be housed within a single device. The processor of the motion control system 360 is configured to execute instructions with respect to the transfer. The instructions are intended to be stored within the memory component.

Figure 4:
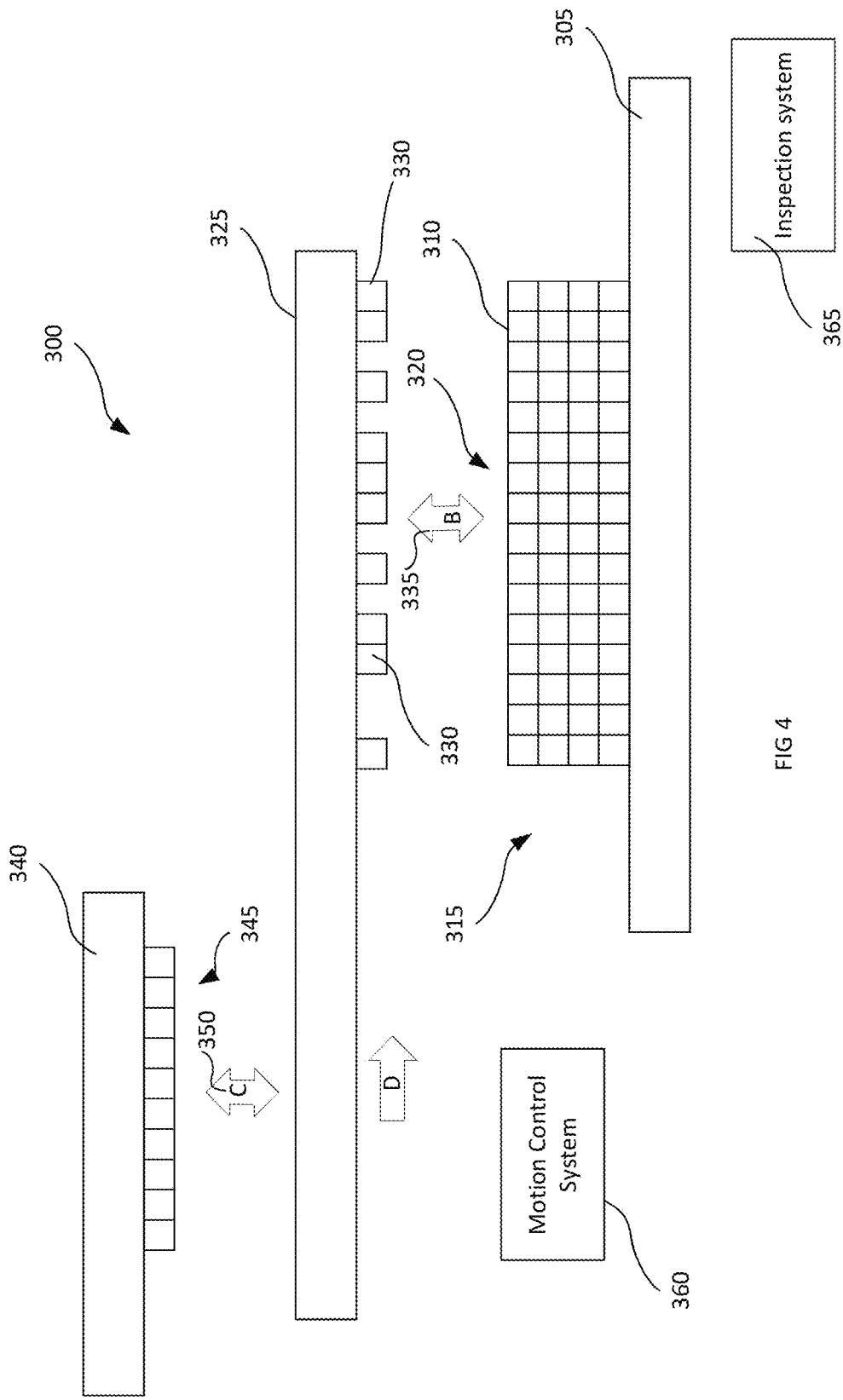
FIG. 4 illustrates the system of FIG. 3 during operation.

FIG. 4 illustrates the transfer conveyor 325 independently moving (illustrated by arrow "D") the plurality of receiving moving elements 330 to match the configuration/pitch of the selected/good parts (non-blanks) in the first set of parts 320. As the moving elements 330 are moving, the pick and place device 335 may be lowering to the pallet 310 on the first conveyor 305 and picking up selected/good parts. In some cases, the pick and place device 335 will be configured to be able to pick from all locations on the pallet 310 and only pick those where there is a selected/good part. In others, the pick and place device may be more programmable. Less intelligent pick and place devices are generally cheaper and can have faster cycle times/longer lives than pick and place devices that are configured to pick up specific and varying parts from the pallet 310. The pick and place device 335 then moves and places the picked parts in the moving elements 330 of the transfer conveyor 325. This process can be efficient because the moving elements 330 are positioned to accurately and efficiently receive the selected parts from the pick and place device 335 without the pick and place device needing additional movements that would generally be needed if the moving elements 330 could not be independently positioned.

The system 300 or other embodiments may include an inspection system 365 or an inspection system may be available prior to the station 315 to determine the positions of the selected/good parts, the voids and/or the faulty parts. The inspection system 365 may be communicatively connected to the control system 106 and/or the motion control system 360 of the transfer conveyor 335 or the like to arrange the location of the receiving moving elements 330. The positioning of the receiving moving elements 330 may be done at any appropriate timing, for example, as the pick and place device 335 is operating, immediately after the pick and place device 335 has picked up the parts, or the like. As the transfer conveyor 325 can move the moving elements 330 independently without any issues of cables intertwining, the moving elements 330 can be aligned in appropriate positions to be loaded with good parts. In particular, there is no need to make additional movements of the pick and place device 335 or of a conveyor to avoid any blanks.

In various embodiments, the pick and place device 335 can have various configurations. For example, the pick and place device 335 may have grippers that are not individually controllable (i.e. configured to grip whatever is below them). When these grippers encounter a blank, the gripper will just close without picking a part, or may pick a faulty part, and that faulty part will be dealt with at the transfer conveyor, as it will not be received by a receiving moving element. In a case where the grippers are individually controllable, individual grippers associated with the good parts in the configuration will be picked while faulty parts may remain on the first conveyor. In this case, the faulty parts remaining may be transported by the first conveyor to a different location to be refurbished or disposed of.

The control system 106 in connection with the motion control system 360 is configured to align a plurality of receiving moving elements 330 to the positions corresponding to the relative locations of the good parts in the pallet 310. As noted, in some cases, the receiving moving elements 330 may be positioned to allow for gaps where there are voids or faulty parts within the pick and place device 335, and the faulty parts may end up in a receptacle configured to receive the faulty parts, for example, under the transfer conveyor or the like. In other cases, the faulty parts may have been previously removed by a quality assurance process and only voids and good parts may be located within the first moving element. In still other cases, the faulty parts may not be selected and may remain on the first moving element and be rejected at another processing station on the first linear conveyor system.

In some cases, the pick and place device 335 may make multiple runs in order to fill the moving elements 330 of the transfer conveyor 325. For example, a determination of what part the pick and place grippers will pick may be dependent on which parts would be able to be placed into the at least one receiving moving element. In some cases, the receiving moving elements may already be partially loaded, and only a subset of parts may be moved from the pallet 310 (first configuration) to the receiving moving elements 330. In a specific example, there may be between 30 to 40 grippers on a pick and place device 335, but the receiving moving elements 330 may only have 5 empty spaces within which to receive parts. In this case, the pick and place device 335 will select good parts and the receiving moving elements 330 can be adjusted to receive those good parts into the empty spaces remaining.

Figure 5:
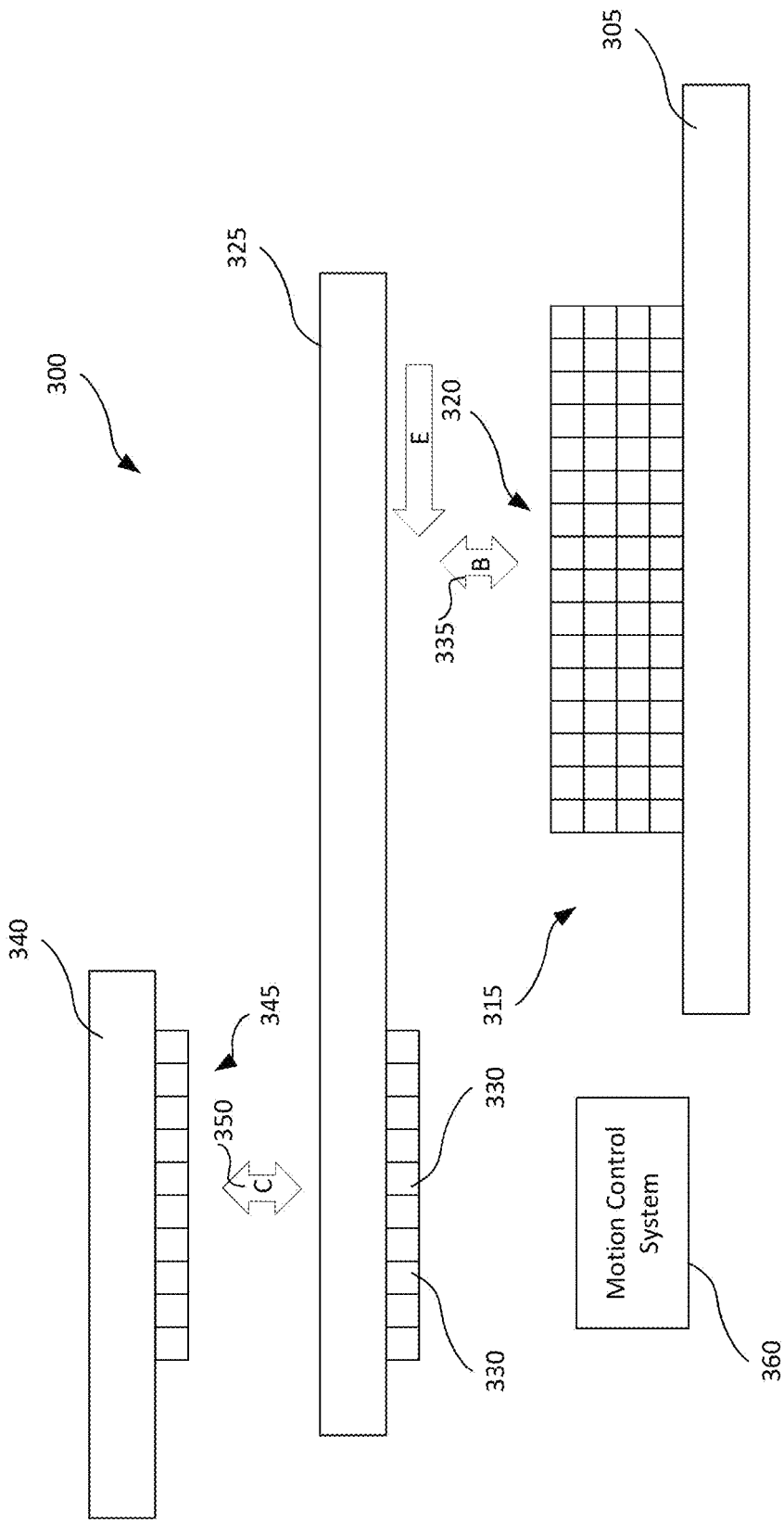
FIG. 5 illustrates the system of FIG. 3 during operation.

FIG. 5 illustrates that, once parts have been placed onto the receiving moving elements 330 of the transfer conveyor 325, the receiving moving elements 330 can be repitched into a second configuration (illustrated by arrow "E"). The second configuration is different from the first configuration and may, for example, have a predetermined pitch and/or be brought together to create a contiguous grouping of selected/good parts without any blanks. It will be understood that the control system 106 alone or in connection with the motion control system 360 may be configured to move the receiving moving elements 330 into any appropriate formation as configured by the system 100. In this embodiment, the second configuration will generally be linear due to the nature of the linear motor conveyor. However, as described below with respect to FIG. 8, additional linear motor conveyors could be used to provide a second configuration of parts such as square, circular, triangular, or the like.

In this particular embodiment, the moving elements 330 are moved together to match a configuration/pitch of the second pallet 345 for further transfer of the parts to the third conveyor 340 to continue the processing of the parts. The parts are moved by the second pick and place device 350 (illustrated by arrow "C") that picks parts from the transfer conveyor 325 and moves them to the third conveyor 340. In some cases, the parts may be transferred into, for example, a packing container or the like, either on the third conveyor 340 or in some other configuration, and then moved for further processing, such as sealing the packing container or the like. The third conveyor is an optional element.

The same cycle may then be repeated as necessary to move good parts from the first conveyor 305 (first configuration) in an organized fashion to the third conveyor 340 (second configuration) via the pick and place devices 335, 350 and the transfer (second) conveyor 325. The speed and flexibility of the linear motor conveyor system used as the transfer conveyor 325 allows the moving elements 330 to adapt to the locations of the good parts and re-pitch the various good parts to match with the requirements of the second pallet 345 for further processing in the new configuration.

Figure 6:
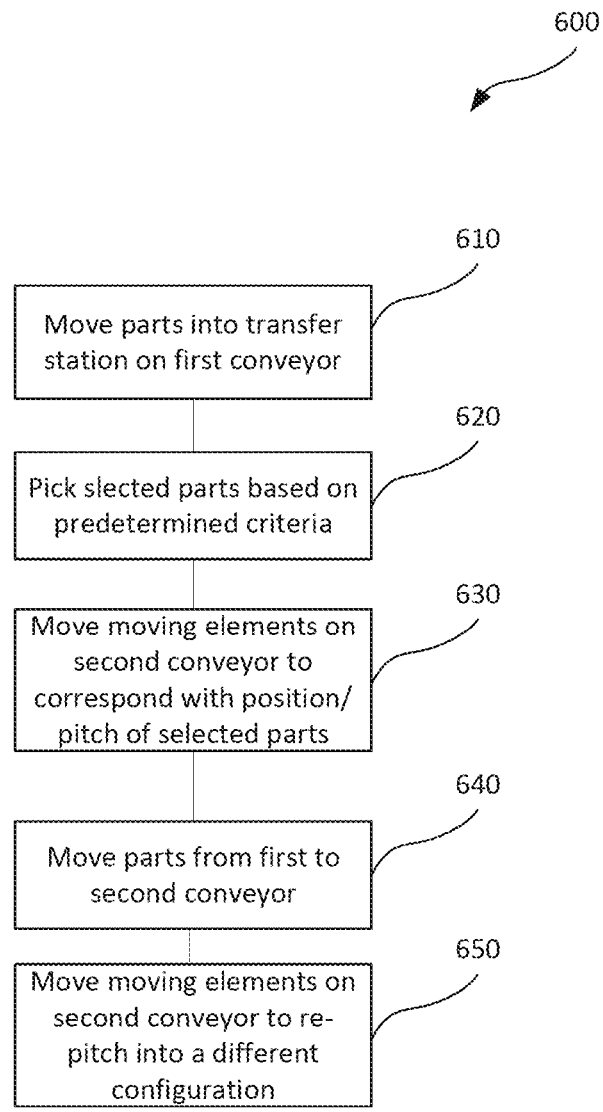
FIG. 6 is a flow chart illustrating a method for parts handling according to an embodiment.

FIG. 6 is a flowchart of a method for parts handling 600 according to an embodiment. At 610, a first conveyor moves a pallet containing a plurality of parts into a transfer station. The plurality of parts are in a first configuration, for example, a matrix of rows and columns of parts. It will be understood that various other configurations may also be possible and may be based on, for example, the previous processing performed on the parts or the like.

As noted in the description above, the first configuration may include some combination of good parts and blanks. Further, an inspection system connected with the first conveyor may be configured to determine the position or location of the good parts. In some cases, the control system may be operatively connected to a vision system or the like wherein the vision system relays the positions of the parts that have failed a particular quality assurance test or are otherwise noted as faulty.

At 620, a subset of the parts are selected based on a predetermined criterion. In this case, the selection is made based on whether the part is good or faulty but other criteria may also be applicable. In some cases, the criterion may be whether or not a part is present at a particular location in the first configuration of parts. In other cases, the criterion may be related to the nature of the parts themselves, for example, left/right handed-ness, or size, or the like. In other cases, there may be more than one criterion applied in selecting the parts.

At 630, moving elements on a second conveyor, sometimes called a transfer conveyor, are moved independently to positions related to (for example, adjacent) the positions of the selected parts.

At 640, a pick and place device moves the selected parts to the second conveyor. The pick and place device can be fairly basic due to the related/aligned positioning of the receiving moving elements in relation to the selected parts.

At 650, once the receiving moving elements have received the selected (good) parts from the pick and place device, the receiving moving elements can be arranged in a second predetermined configuration (for example, a second predetermined pitch or the like) as desired for further processing. The further processing may occur after movement to a further conveyor but may also occur at, for example, another station on the second conveyor.

Figure 7:
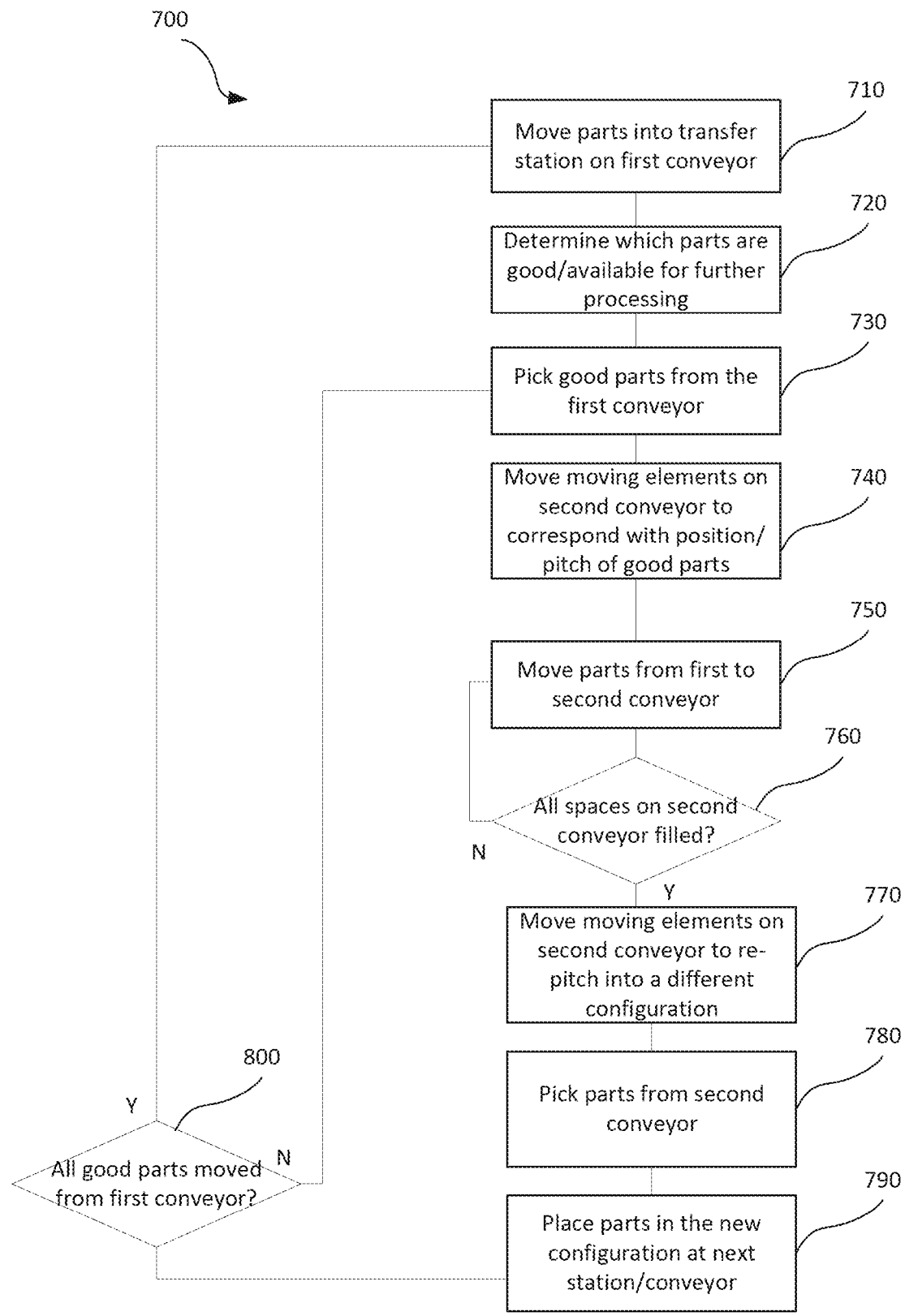
FIG. 7 is a flow chart illustrating a method for parts handling according to another embodiment.

FIG. 7 is a flowchart of a method for parts handling 700 according to another embodiment. At 710, a first conveyor moves a pallet containing a plurality of parts into a transfer station. The plurality of parts are in a first configuration and may include good parts and also blanks.

At 720, an inspection system operating in co-ordination with the first conveyor determines the position or location of the good parts.

At 730, a pick and place device picks parts from the first conveyor.

At 740, moving elements on a second conveyor, sometimes called a transfer conveyor, are moved independently to positions adjacent to the positions of the good/selected parts.

At 750, the pick and place device moves the selected parts to the moving elements on the second conveyor. As noted above, the movement is efficient because the moving elements are in a position to accurately receive the good parts from the pick and place.

At 760, it is determined if all of the moving elements on the second conveyor have been filled. If not, the pick and place device moves additional parts. Otherwise the process advances.

At 770, once the receiving moving elements have received the good parts from the pick and place device, the receiving moving elements can be moved independently to be arranged in a second predetermined configuration/pitch as desired.

In this embodiment, a second pick and place device picks the parts from the transfer conveyor, at 780, and transfers the parts to a station/third conveyor for further processing at 790.

The system then determines if all good parts have been transferred from the first conveyor at 800. If not, the pick and place picks the next good parts from the first conveyor at 730 and the process repeats. Once all good parts have been moved, the process returns to 710 and more parts can be advanced on the first conveyor.

It will be understood by one of skill in the art that there may be further embodiments of the method that fall between the methods illustrated in FIGS. 6 and 7, in which some elements of the method in FIG. 7 may be optional or modified slightly but achieving a similar purpose.

Figure 8:
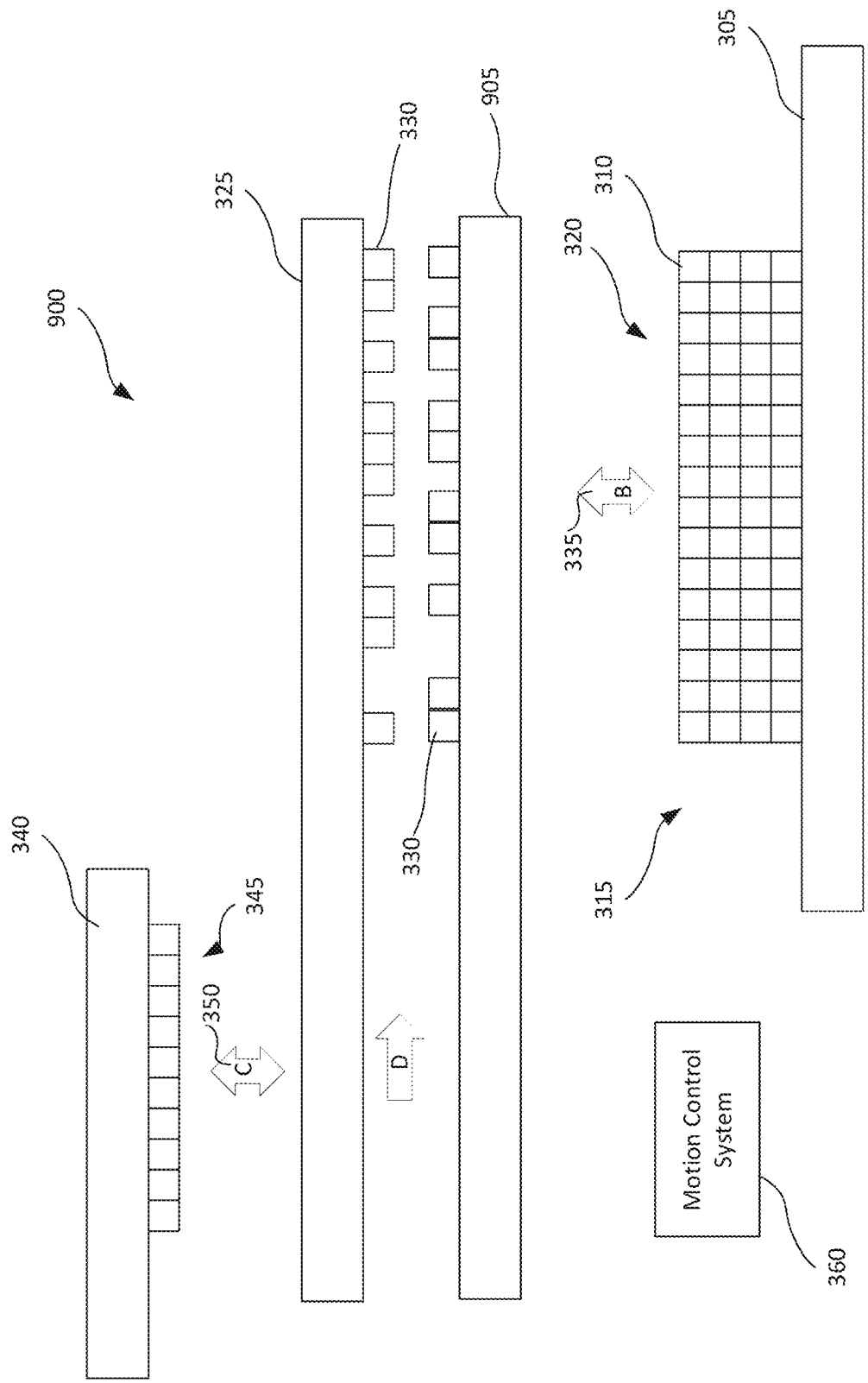
FIG. 8 shows a further embodiment of the system for handling parts.

FIG. 8 illustrates a further embodiment of the system for handling parts 900. This embodiment is similar to the embodiment illustrated in FIGS. 3-5 and similar elements will be designated with similar reference numerals. However, it is noted that elements of each embodiment may be used with each other embodiment as would be reasonable to one of skill in the art. In this embodiment, the system 900 includes two transfer conveyors 325, 905 to provide for further throughput of parts. In this case, the first pick and place device 335 may be configured to pick a larger number of good parts for transfer to related receiving moving elements 330 on each of the transfer conveyors. In one example, two rows of selected good parts can be selected and placed in the two rows of the receiving moving elements 330, each on a separate transfer conveyor 325, 905. In a similar way, once reconfigured/repitched the second pick and place device 350 can transfer a larger number of selected/good parts for further processing, either by moving parts in a single or multiple movements from the transfer conveyors. By adding additional linear motor conveyors, it will be understood that the second configuration of parts can have various formats, such as square, circular, triangular, or the like.

In some embodiments, the pick and place device may alternatively be a linear motor conveyor system configured to grip/shuttle or otherwise transport the selected/good parts from the first conveyor to at least one receiving element in the receiving conveyor system. In this situation, the linear motor conveyor system as pick and place device will have independent control of the moving elements and can re-pitch/re-configure the parts during the pick and place operation to allow the parts to be moved from a first predetermined configuration to a second predetermined configuration, while removing blanks from the configuration.

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for parts handling comprising:
   a plurality of parts arranged in a first configuration comprising good parts and faulty parts;
   a linear motor conveyor comprising a linear motor track and a plurality of moving elements wherein the plurality of moving elements can be independently positioned along the linear motor track;
   a pick and place device configured to move at least a predetermined subset of the plurality of parts from the first configuration to the linear motor conveyor system, wherein the predetermined subset of the plurality of parts comprises good parts; and
   a control system in communication with the linear motor conveyor and pick and place device and configured to:
   determine locations of the predetermined subset of the plurality of parts within the first configuration;
   control the linear motor conveyor to move the moving elements to positions related to the locations of the predetermined subset of parts within the first configuration;
   control the pick and place device to move the predetermined subset of parts simultaneously to the corresponding moving elements; and
   after receiving the parts, move the moving elements such that the predetermined subset of parts has a second configuration that is different from the first configuration.

2. A system according to claim 1 wherein the first configuration further comprises blanks.

3. A system according to claim 1 wherein the first configuration comprises a matrix of rows and columns.

4. A system according to claim 1 wherein the second configuration comprises a linear row.

5. A system according to claim 1 further comprising a detection device in communication with the control system and configured to determine the locations of the selected subset of parts.

6. A system according to claim 1 wherein the second configuration comprises only good parts.

7. A system according to claim 1 wherein positions related to the locations of the predetermined subset of parts within the first configuration comprise positions adjacent to the locations of the predetermined subset of parts within the first configuration.

8. A system according to claim 1 wherein the linear motor conveyor comprises more than one linear motor conveyor and the control system controls each of the more than one linear motor conveyors to independently move respective moving elements to positions related to the locations of the predetermined subset of parts within the first configuration.

9. A method for parts handling comprising:
   moving a plurality of parts having a first configuration to a transfer station;
   selecting at least a subset of the plurality of parts based on a predetermined criterion, wherein the predetermined criterion comprises a determination of whether a part is good or faulty;
   moving elements on a second conveyor to positions related to positions of the selected subset of the plurality of parts in the first configuration;
   moving the selected subset of the plurality of parts to the related moving elements on the second conveyor; and
   once the moving elements are full, moving the moving elements into a second configuration that is different from the first configuration.

10. A method according to claim 9 wherein the first configuration comprises blanks as well as parts.

11. A method according to claim 9 wherein the first configuration comprises a matrix of rows and columns and the second configuration comprises a linear row.

12. A method according to claim 9 wherein the predetermined criterion comprises a determination of whether a part is available for further processing or not.

13. A method according to claim 9 further comprising determining if all moving elements on the second conveyor are filled or not and, if not, repeating the selecting at least a subset through to the moving the selected subset until the moving elements are filled.

14. A method according to claim 9 further comprising transferring the parts from the second configuration for further processing.

15. A method according to claim 14 the transferring the parts from the second configuration for further processing comprises picking and placing the parts in the second configuration onto a third conveyor.

16. A method according to claim 14 further comprising determining if all parts meeting the predetermined criterion have been moved to the second configuration and transferred for further processing and, if not, repeating the method of claim 10 from selecting at least a subset of parts.

17. A method according to claim 9 further comprising detecting, via a detection device, positions of the selected subset of parts.

18. A method according to claim 9 wherein positions related to positions of the selected subset of the plurality of parts in the first configuration comprise positions adjacent to the positions of the predetermined subset of parts within the first configuration.

\* \* \* \* \*